(12) United States Patent
Zhou et al.

(10) Patent No.: US 7,576,957 B2
(45) Date of Patent: Aug. 18, 2009

(54) CIRCUIT INTERRUPTER INCLUDING POINT-ON-WAVE CONTROLLER AND VOLTAGE SENSORS

(75) Inventors: Xin Zhou, Franklin Park, PA (US); Brad R. Leccia, Bethel Park, PA (US); Lian Q. Zou, Glendale, WI (US); James J. Benke, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 406 days.

(21) Appl. No.: 11/414,918

(22) Filed: May 1, 2006

(65) Prior Publication Data

US 2007/0253124 A1    Nov. 1, 2007

(51) Int. Cl.
*H02H 3/00* (2006.01)
(52) U.S. Cl. ......................................... 361/2
(58) Field of Classification Search ................ 361/2
See application file for complete search history.

(56) References Cited

U.S. PATENT DOCUMENTS

| | | | | |
|---|---|---|---|---|
| 4,356,525 A | * | 10/1982 | Kornrumpf et al. | ............ 361/4 |
| 5,430,599 A | * | 7/1995 | Charpentier et al. | ........ 361/152 |
| 5,559,426 A | * | 9/1996 | Shea et al. | .................. 323/319 |
| 5,963,021 A | * | 10/1999 | Rostron et al. | .............. 323/210 |
| 2005/0013085 A1 | | 1/2005 | Kinsella et al. | |

OTHER PUBLICATIONS

Optisense Network, Inc., "Electro Optic High Voltage Sensor", 2006, 2 pp.
Optisense Network, Inc., "Electro Optic Voltage Sensor", 2004, 2 pp.
Optisense Network, Inc., "Electro-Optic High Voltage Sensor for Outdoor Applications", 2005, 2 pp.
Optisense Network, Inc., "Electro-Optic High Voltage Sensor for Indoor Applications", 2005, 2 pp.

* cited by examiner

*Primary Examiner*—Stephen W Jackson
(74) *Attorney, Agent, or Firm*—Martin J. Moran

(57) ABSTRACT

A circuit breaker includes a circuit breaker housing and a plurality of independent poles. Each of the independent poles includes separable contacts, a voltage sensor mounted on or within the circuit breaker housing and being structured to sense voltage operatively associated with the separable contacts, and an electro-magnetic actuator structured to open and close the separable contacts. A point-on-wave controller is housed by the circuit breaker housing and cooperates with the sensors and the actuators of the independent poles to independently and synchronously open and close the separable contacts of the independent poles.

16 Claims, 15 Drawing Sheets

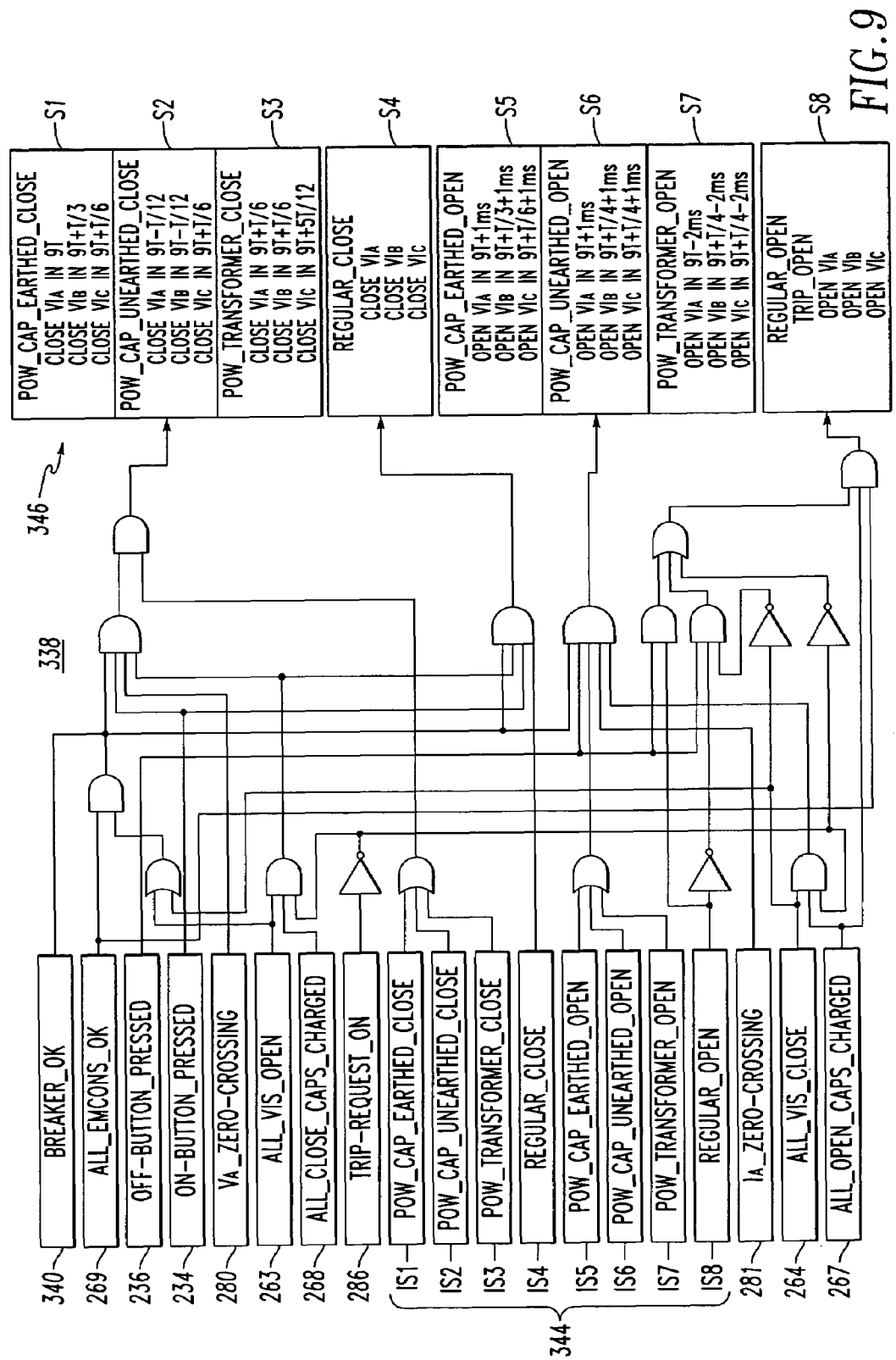

CIRCUIT INTERRUPTER INCLUDING POINT-ON-WAVE CONTROLLER AND VOLTAGE SENSORS

CROSS-REFERENCE TO RELATED APPLICATIONS

This application is related to commonly assigned, concurrently filed:

U.S. patent application Ser. No. 11/414,941, filed May 1, 2006, entitled "Manual Opening Device And Electrical Switching Apparatus Employing The Same"; and U.S. patent application Ser. No. 11/414,917, filed May 1, 2006, entitled "Circuit Interrupter Including Manual Selector Selecting Different Point-On-Wave Switching Characteristics".

BACKGROUND OF THE INVENTION

1. Field of the Invention

This invention pertains generally to circuit interrupters and, more particularly, to a circuit breaker including a plurality of independent poles which are controlled by a point-on-wave controller.

2. Background Information

Circuit interrupters provide protection for electrical systems from electrical fault conditions such as, for example, current overloads and short circuits. Various circuit interrupters include a spring powered operating mechanism, which opens electrical contacts to interrupt the current through the conductors of an electrical system in response to abnormal conditions, although a wide range of mechanical, electro-mechanical or other suitable driving mechanisms may be employed.

Vacuum circuit interrupters (e.g., vacuum circuit breakers; vacuum reclosers; other vacuum switching devices) include separable contacts disposed within an insulating housing. Vacuum circuit interrupters, such as, for example, power circuit breakers for systems operating above about 1,000 volts, typically utilize vacuum switches (not to be confused with vacuum switching devices), such as vacuum interrupters (not to be confused with vacuum circuit interrupters), as the switch element.

Point-On-Wave (POW) technology is applied to circuit interrupters in order to reduce switching transients (e.g., transient currents; excessive over-voltage) during separable contact closing and to minimize contact erosion during interruption. Such synchronous switchgear is used to reduce the switching transients on equipment and extend the life of the circuit interrupters in, for example, medium and high voltage systems. For example, in a three-pole POW circuit breaker, the three poles are operated independently in order to achieve synchronous or POW switching.

It is known to customize a POW circuit breaker to energize or de-energize one and only one of the following types of loads: (1) a grounded capacitor bank; (2) an un-grounded capacitor bank; (3) a transfer switch (e.g., synchronize the line voltage and the load voltage, in order that they are in the same voltage phase angle when connected to minimize transient currents); (4) a transformer; (5) a medium voltage motor controller; and (6) a shunt reactor (e.g., for grounded high voltage shunt reactors, the three phases should be energized at the maximum value of the phase-to-earth voltage).

When, for example, a capacitor bank, a transfer switch, a transformer or a medium voltage motor controller is switched in, transient over voltages and high compensating currents can occur. To reduce this stress, a customized three-pole POW circuit breaker operates synchronously at specific predetermined phase angles of the line voltages or currents. Such a POW circuit breaker includes three independent operating mechanisms that are controlled differently to achieve the customized POW switching for the specific corresponding load.

Known medium voltage vacuum circuit interrupters employ potential transformers, which have a relatively large size and weight. Such potential transformers are so large and heavy that they must be housed in a separate compartment apart from the corresponding circuit interrupters in the switchgear or motor control center housing.

Known POW circuit interrupters employ customized mechanical parts and/or customized electrical parts in order to create a corresponding set of phase angle switching characteristics for one particular opening and closing application (e.g., for a grounded capacitor bank). In other words, the very same POW circuit interrupter cannot be used to create a different set of phase angle switching characteristics for another different opening and closing application (e.g., for an un-grounded capacitor bank; a transformer; a transfer switch; a medium voltage motor controller).

One known three-pole POW circuit interrupter employs a preprogrammed POW controller that drives three linear actuators to create the corresponding set of phase angle switching characteristics for one particular predetermined opening and closing application. A different POW controller must be used to create a different set of phase angle switching characteristics for another different opening and closing application.

There is room for improvement in circuit interrupters.

There is also room for improvement in circuit breakers including plural independent poles.

SUMMARY OF THE INVENTION

These needs and others are met by embodiments of the invention that provide a circuit interrupter in which a number of voltage sensors are mounted on or within a circuit interrupter housing in order sense voltage operatively associated with separable contacts of a plurality of independent poles, and in which a point-on-wave controller is housed by the circuit interrupter housing and controls a plurality of actuators structured to open and close such separable contacts.

In accordance with one aspect of the invention, a circuit interrupter comprises: a circuit interrupter housing; a plurality of independent poles, each of the independent poles comprising: separable contacts, at least one sensor, one of the at least one sensor being mounted on or within the circuit interrupter housing and being structured to sense voltage operatively associated with the separable contacts, and an actuator structured to open and close the separable contacts; and a point-on-wave controller housed by the circuit interrupter housing and cooperating with the sensors and the actuators of the independent poles to independently and synchronously open and close the separable contacts of the independent poles.

The sensed current may include a zero crossing, and the point-on-wave controller may be structured to independently and synchronously open the separable contacts of the independent poles at a plurality of different predetermined phase angles with respect to the zero crossing of the sensed current.

The sensed voltage may include a zero crossing, and the point-on-wave controller may be structured to independently and synchronously close the separable contacts of the independent poles at a plurality of different predetermined phase angles with respect to the zero crossing of the sensed voltage.

The one of the at least one sensor may be an electro-optical sensor.

The voltage may be a medium voltage, the circuit interrupter may be a medium voltage circuit interrupter, and the electro-optical sensor may be structured to sense the medium voltage.

The medium voltage may be from about 1 kV to about 40 kV.

As another aspect of the invention, a circuit breaker comprises: a circuit breaker housing; a plurality of independent poles, each of the independent poles comprising: separable contacts, a voltage sensor mounted on or within the circuit breaker housing, the voltage sensor being structured to sense voltage operatively associated with the separable contacts, a current sensor structured to sense current operatively associated with the separable contacts, and an actuator structured to open and close the separable contacts; a point-on-wave controller integral with the circuit breaker housing, the point-on-wave controller cooperating with at least one of the voltage sensors of the independent poles, at least one of the current sensors of the independent poles and the actuators of the independent poles to independently and synchronously open and close the separable contacts of the independent poles; and a protective relay cooperating with the current sensors of the independent poles and the point-on-wave controller to trip open the separable contacts of the independent poles.

BRIEF DESCRIPTION OF THE DRAWINGS

A full understanding of the invention can be gained from the following description of the preferred embodiments when read in conjunction with the accompanying drawings in which:

FIG. 9 is a block diagram of the POW logic of the POW controller of FIG. 7.

DESCRIPTION OF THE PREFERRED EMBODIMENTS

Figure 1:
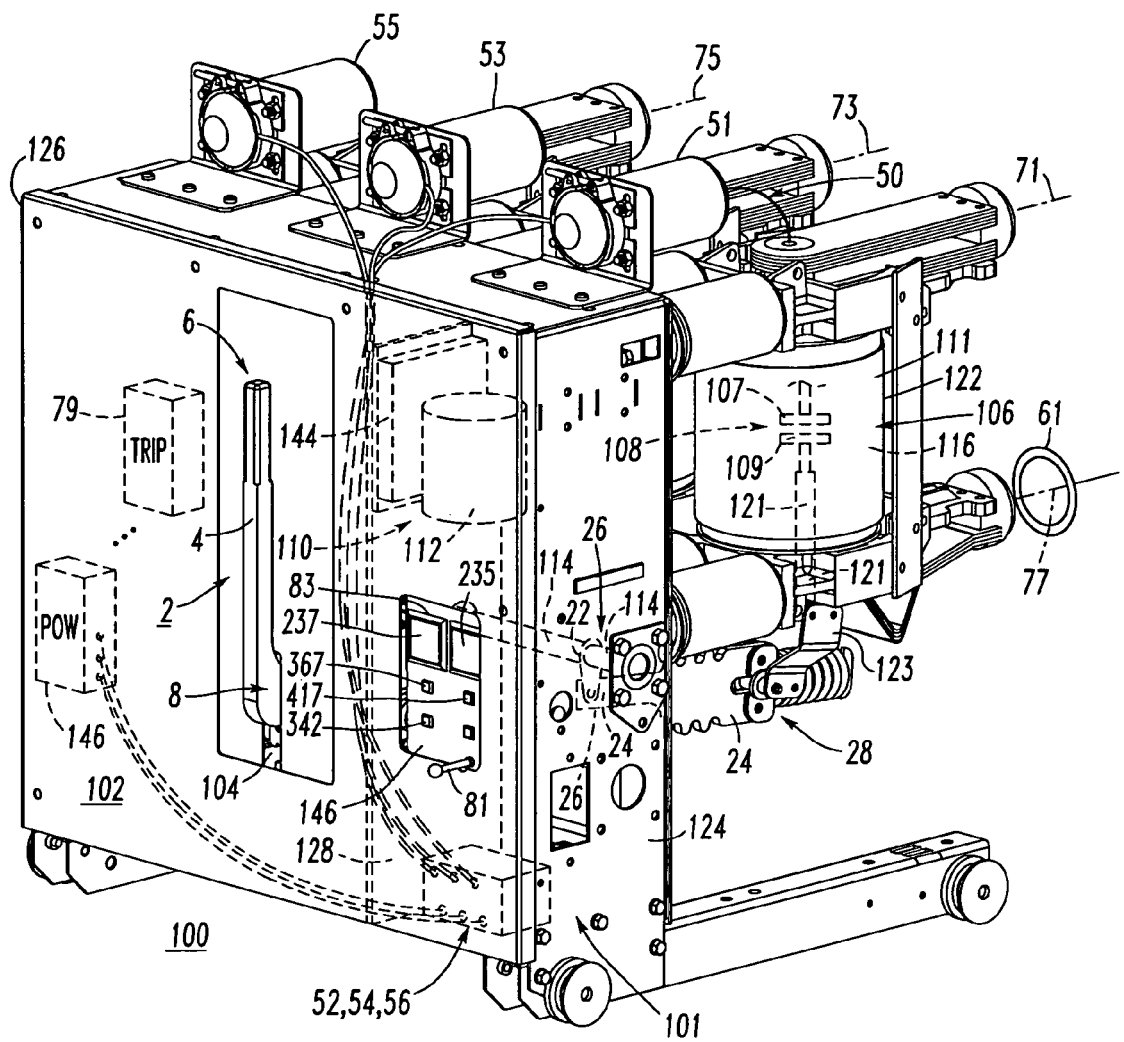
FIG. 1 is an isometric view of the front side of a Point-On-Wave (POW) circuit breaker and a manual selector therefor, in accordance with an embodiment of the invention.

Directional phrases used herein, such as, for example, left, right, clockwise, counterclockwise and derivatives thereof, relate to the orientation of the elements shown in the drawings and are not limiting upon the claims unless expressly recited therein.

As employed herein, the term "fastener" refers to any suitable connecting, tightening or fastening mechanism expressly including, but not limited to, screws, bolts and the combinations of bolts and nuts (e.g., without limitation, lock nuts) and bolts, washers and nuts.

As employed herein, the statement that two or more parts are "coupled" together means that the parts are joined together either directly or joined through one or more intermediate parts.

As employed herein, the term "number" means one or an integer greater than one (i.e., a plurality).

As employed herein, the term "integral" means that a part is formed as a single unit with another part.

The invention is disclosed in association with a magnetically actuated, medium voltage vacuum circuit breaker having three independent poles, although the invention is applicable to a wide range of circuit interrupters (e.g., without limitation, reclosers, circuit switching devices and other interrupters, such as contactors, motor starters, motor controllers and other load controllers) including any suitable count of vacuum-based or non-vacuum-based separable contacts suitable for a wide range of voltages and actuated by a wide range of suitable actuation mechanisms.

Figure 2:
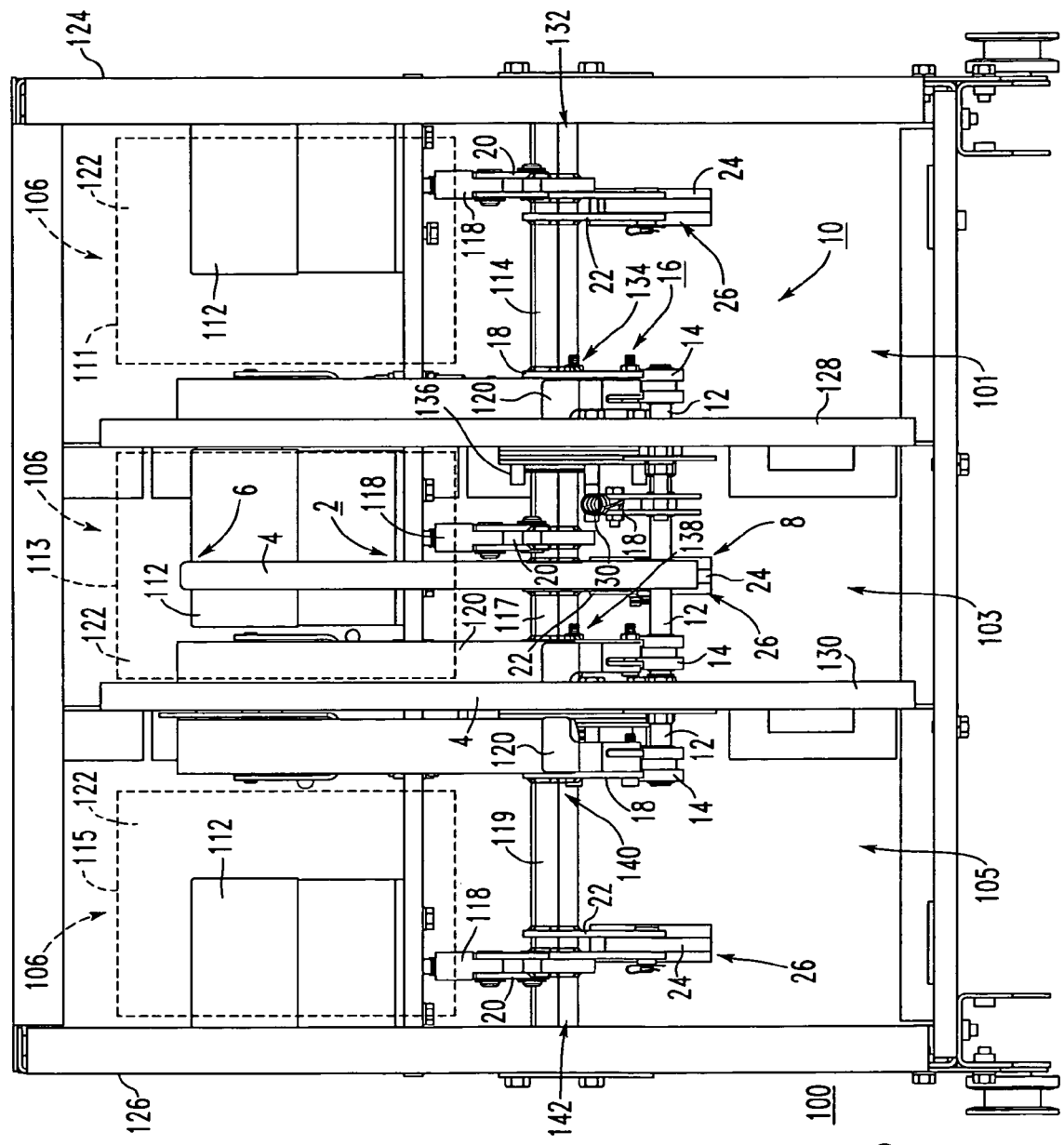
FIG. 2 is a vertical elevational view of the front side of the POW circuit breaker of FIG. 1.
Figure 13:
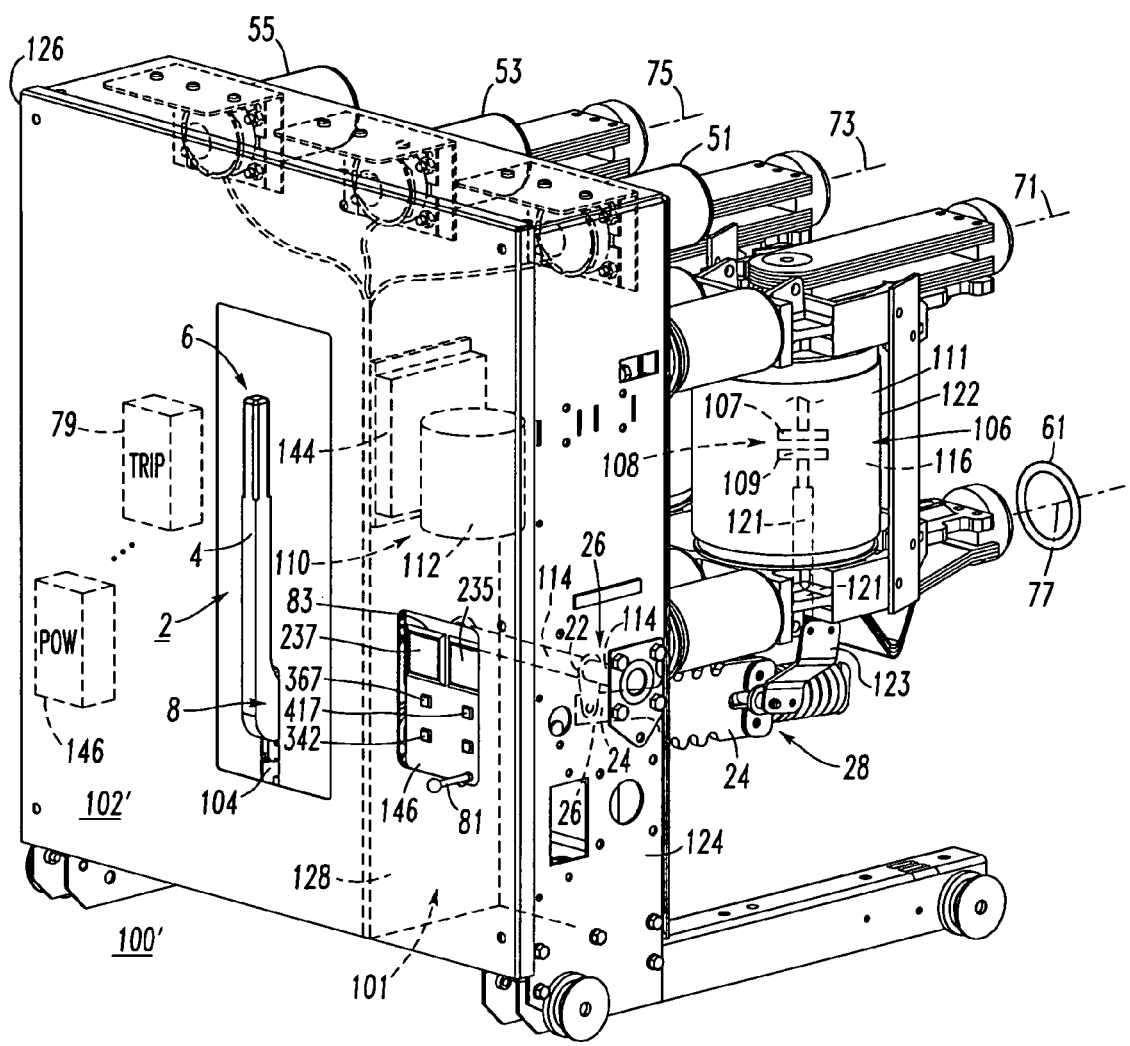
FIG. 13 is an isometric view of a POW circuit breaker in accordance with another embodiment of the invention.

Referring to FIG. 1, a circuit interrupter, such as medium voltage vacuum circuit breaker 100, includes a circuit interrupter housing 102 and three independent poles 101,103,105 (three poles 101,103,105 are shown in FIG. 2). Each of the independent poles 101,103,105 includes separable contacts 108 (shown in hidden line drawing), a number of sensors (e.g., a corresponding one of the voltage sensors 51,53,55 and a corresponding one of the current sensors 63,65 (shown in FIG. 8B) and 61 (FIGS. 1 and 8B)), and an actuator 112. The example voltage sensors 51,53,55 are mounted on the circuit interrupter housing 102 (as shown in FIG. 1) and are structured to sense voltage operatively associated with the separable contacts 108. In particular, as shown with conductor 50 and sensor 51, the voltage sensors 51,53,55 are electrically connected to a corresponding one of the line power busses 71,73,75, respectively, to sense the corresponding line voltage. The outputs of the sensors 51,53,55 may employ electronic boxes 52,54,56, respectively, as shown in FIG. 8B. The electronic boxes 52,54,56 generate light signals sent to and receive light signals coming back from the respective sensors 51,53,55. These electronic boxes also analyze the received light signals and convert them into analog output representations of the measured line voltages for the POW controller 146. Alternatively, the voltage sensors 51,53,55 may be embedded into the isolation stand that supports the vacuum interrupters as shown with the circuit breaker 100' of FIG. 13.

EXAMPLE 1

For example, the voltage sensors 51,53,55, as shown, are electro-optical sensors structured to sense a medium voltage from about 1 kV up to about 40 kV. These relatively small and light electro-optical voltage sensors, which are located on the top of the example circuit breaker housing 102, enable medium voltage measurement in a relatively compact package. These electro-optical voltage sensors galvanically isolate the signal to the POW controller 146 from the corresponding medium voltage being measured. An example of the electro-optical medium voltage sensors is an OptiSense 15 kV Class Voltage Sensor for Embedded Applications marketed by OptiSense Network, Inc. of Bridgeport, Tex.

EXAMPLE 2

For the example circuit breaker 100, the phase current signals are provided by external (e.g., located at the corresponding load power busses (as shown at bus 77) or within the switchgear enclosure (not shown)) current sensors 61,63,65, although the invention is applicable to current sensors located within the circuit breaker housing 102. For example, the current sensors 61,63,65 are current transformers structured to sense load current flowing through the separable contacts 108 of a corresponding one of the independent poles 101,103, 105.

EXAMPLE 3

The three actuators 112 are magnetically actuated actuators (e.g., linear actuators) structured to open and close the corresponding separable contacts 108. Alternatively, any suitable actuator may be employed. Non-limiting examples include Piezo actuators, electro-mechanical actuators and electro-pneumatic actuators.

The three example independent poles 101,103,105 are operated independently by three independently controlled operating mechanisms in order to achieve synchronous switching, also called point-on-wave (POW) switching. The circuit breaker 100 provides an integral three-phase voltage monitoring system and the POW controller 146 capable of performing the synchronous switching. The POW controller 146 (shown in hidden line drawing in FIG. 1) is housed by the circuit interrupter housing 102 (e.g., the POW controller 146 is integral with the housing 102) and cooperates with a number of the sensors 51,53,55,61,63,65 and the three actuators 112 of the independent poles 101,103,105 to independently and synchronously open and close the separable contacts 108 thereof. A protective relay (e.g., trip unit 79) cooperates with the current sensors 61,63,65 and the POW controller 146 to trip open the separable contacts 108 of the independent poles 101,103,105. The trip unit 79 may, alternatively, be a protective relay (e.g., that senses currents, determines if there is a fault, and sends a trip signal to the circuit breaker 100 to open the protected circuit). The protective relay may be located outside (not shown) of the circuit breaker 100 or may be integrated into the circuit breaker (as shown with the trip unit 79).

EXAMPLE 4

As will be discussed, below, in connection with FIGS. 4-7, 8A-8B and 9-12, the POW controller 146 also cooperates with a manual selector 81 to independently and synchronously open and close the separable contacts 108 of the independent poles 101,103,105 as a function of a particular point-on-wave switching characteristic as selected by the manual selector 81. The manual selector 81 is structured to select at least a point-on-wave switching characteristic from a plurality of different switching characteristics. For example, the manual selector 81 may be a relatively small, hand operated rotary switch, located on the front panel 83 of the circuit breaker 100. The manual selector 81 enables a user to set the circuit breaker 100 to the desired type of POW switching including, for example and without limitation: switching of grounded capacitor banks, un-grounded capacitor banks, transformers, transfer switches or medium voltage motor controllers, each of which employs different corresponding switching phase angles for optimal performance.

EXAMPLE 5

In the example of FIG. 1, the circuit breaker 100 includes a manual opening device 2. The housing 102 has an opening 104, a plurality a pole mechanisms 106 (FIG. 1 shows a single pole mechanism 106 including a vacuum interrupter 111) each comprising the separable contacts 108 (stationary contact 107 and movable contact 109 are shown in hidden line drawing), and at least one operating mechanism 110 including a number of actuators 112 (one actuator 112 is shown in hidden line drawing). The actuator 112 is structured to open and close the separable contacts 108 of the corresponding one of the pole mechanisms 106. The operating mechanism 110 is supported by the housing 102 and includes a corresponding pole shaft 114 (shown in hidden line drawing).

FIG. 2 shows the circuit breaker 100 with the front cover of the housing 102 (FIG. 1) removed to show internal structures. The circuit breaker 100, in the example shown, includes the first pole 101, the second pole 103, the third pole 105 and the plural pole mechanisms 106. Specifically, the circuit breaker 100 includes a first vacuum interrupter 111 for the first pole 101, a second vacuum interrupter 113 for the second pole 103, and a third vacuum interrupter 115 for the third pole 105. Each of the vacuum interrupters 111, 113, 115 (as shown in simplified form in hidden line drawing in FIG. 2), includes an electrically insulative pod 122 (e.g., vacuum envelope; vacuum bottle) (best shown in FIG. 1) which is coupled to the housing 102 of the circuit breaker 100 by any known or suitable fastener.

Figure 3:
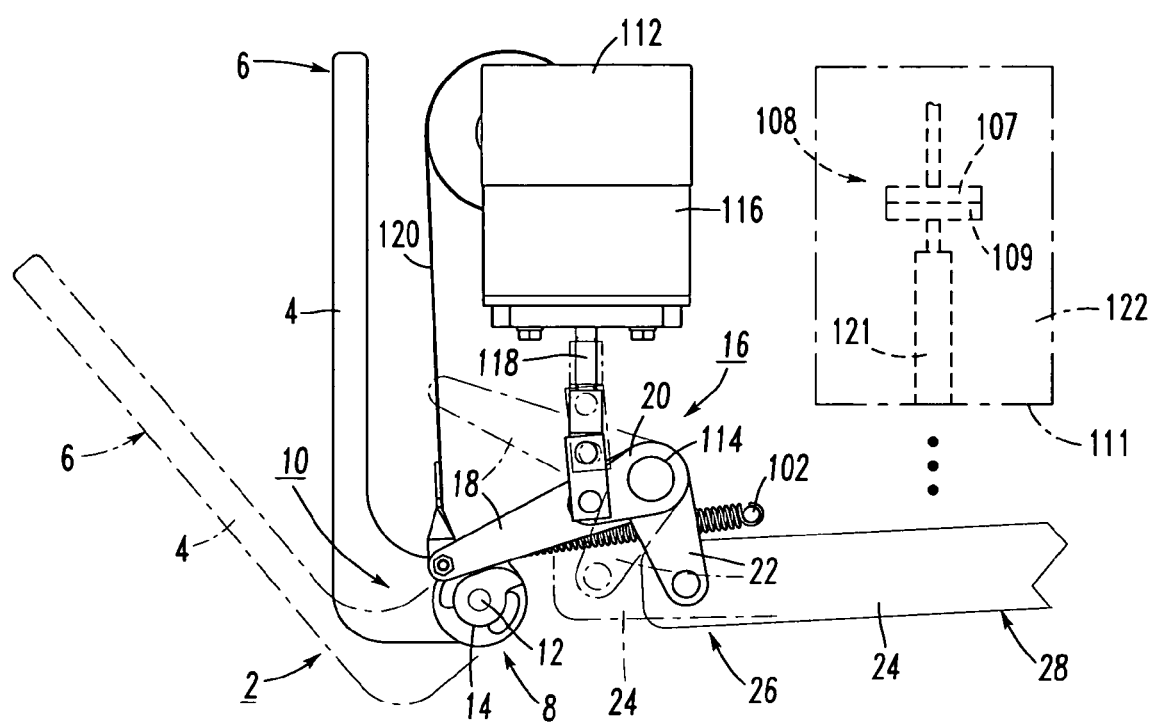
FIG. 3 is a side elevational view of the circuit breaker operating mechanism and manual opening device of FIG. 1, showing one of the magnetic actuators and a corresponding pole shaft in their closed positions, with the operating handle in its normal position.

Referring again to FIG. 1, it will be appreciated that the stationary contact 107 and the movable contact 109 are both disposed within the electrically insulative pod 122. A movable stem mechanism 121 (shown in simplified form in partially hidden line drawing in FIGS. 1 and 3) extends from inside the insulative pod 122 where it couples to the movable contact 109. The movable stem mechanism 121 includes one or more linking element(s) 123 (one linking element 123 is shown in FIG. 1) structured to move the movable contact 109, and thereby open and close the separable contacts 108 when the circuit breaker 100 is opened (shown in phantom line drawing in FIG. 1) and closed (FIG. 3). A linking member, such as the electrically insulative link 24, includes a first end 26 (shown in hidden line drawing) coupled to the corresponding pole shaft 114 of the circuit breaker operating mechanism 110, and a second end 28 coupled to the movable contact 109 of the vacuum interrupter 111 through the movable stem mechanism 121 and linking element(s) 123 thereof.

As shown in one or more of FIGS. 1-3, the manual opening device 2 includes an operating handle 4 having a first end 6 and a second end 8. The first end 6 protrudes through the opening 104 (FIG. 1) of the circuit breaker housing 102. The second end 8 of the operating handle 4 is coupled to a cam assembly 10 (FIG. 3). Specifically, the cam assembly 10 includes a pivot 12, and at least one cam 14 coupled to the pivot 12. It is the pivot 12 to which the second end 8 of the operating handle 4 is coupled. In the example shown and described herein, a drive assembly 16 couples the cam assembly 10 to corresponding first, second, and third pole shafts 114, 117, 119, and the actuators 112. In this manner, the manual opening device 2 is structured to simultaneously open all of the separable contacts 108 of the pole mechanisms 106 when the operating handle 4 is moved from the first normal position (FIG. 3) to the second open position (shown in phantom line drawing).

More specifically, the drive assembly 16 comprises a first protrusion 18, a second protrusion 20, a third protrusion 22, and the aforementioned linking member, which is an electrically insulative link 24 made from any known or suitable electrically insulating material (e.g., without limitation, plastic). Thus, in the example shown and described herein, the drive assembly 16 comprises a corresponding first protrusion 18, a corresponding second protrusion 20, and a corresponding third protrusion 22 for each of the first pole shaft 114, the second pole shaft 117, and the third pole shaft 119 of the circuit breaker 100 (as shown in FIG. 2). The first, second, and third protrusions or lever arms 18, 20, 22 extend generally perpendicularly from the corresponding pole shaft 114, 117, 119. For simplicity of illustration, only the first pole shaft 114 and the first, second and third protrusions 18, 20, 22 therefor, are shown in FIG. 3. When the operating handle 4 is disposed in the first position, as shown in FIG. 3, the first protrusion 18 generally extends from the pole shaft 114 toward pivot 12 and cam 14 of the cam assembly 10. The second protrusion 20 couples the pole shaft 114 to the corresponding actuator 112, and the third protrusion 22 couples the pole shaft 114 through the electrically insulative link 24 to the movable contact 109 of the corresponding vacuum interrupter 111, as previously discussed. Thus, when the corresponding pole shaft 114 pivots as a result of the operating handle 4 being moved, the first, second, and third protrusions 18, 20, 22 extending therefrom move, in order to open (as shown in phantom line drawing in FIG. 1) the separable contacts 108 within the vacuum interrupter 111.

As shown in FIG. 2, the circuit breaker housing 102 includes a first side 124, a second side 126, a first divider 128 between the first pole 101 and the second pole 103, and a second divider 130 between the second pole 103 and the third pole 105. The first end 132 of the first pole shaft 114 is movably coupled to the first side 124 of housing 102, and the second end 134 is movably coupled to one side of the first divider 128. The first and second ends 136,138 of the second pole shaft 117 are movably coupled to the other side of the first divider 128 and the first side of the second divider 130, respectively, and the first and second ends 140,142 of the third pole shaft 119 are movably coupled to the second side of the second divider 130 and the second side 126 of circuit breaker housing 102, respectively. In other words, the first pole shaft 114 is disposed between the first housing side 124 and the first divider 128, the second pole shaft 117 is disposed between the first and second dividers 128,130, and the third pole shaft 119 is disposed between the second divider 130 and the second housing side 126.

Each of the actuators 112 includes a magnet 116, a movable armature 118 coupled to the second protrusion 20 of the corresponding pole shaft, such as 114 (FIG. 3), and a corresponding opening spring 120, which is coupled to the first protrusion 18 of the corresponding pole shaft. With reference to FIG. 3, the opening spring 120 biases the first protrusion 18 and the pole shaft 114 with a first force adapted to open the separable contacts 108 of the corresponding vacuum interrupter 111, and the magnet 116 biases the movable armature 118 with a second force adapted to close the separable contacts 108. The second force of the magnet 116 is greater than the first force of the corresponding opening spring 120 until the operating handle 4 of the manual opening device 2 partially moves toward the second position (as shown in phantom line drawing in FIG. 3).

Magnetic actuators, and the structure and operation thereof, are generally old and well known in the art. The example circuit breaker 100 includes three magnetic actuators 112, one for each of the first, second and third circuit breaker poles 101,103,105 with the corresponding opening spring 120 of the corresponding magnetic actuator 112 being coupled to the corresponding first protrusion 18 of the corresponding one of the first, second or third pole shafts 114,117, 119, as previously discussed.

The example cam assembly 10 includes three cams 14 wherein, in response to partial movement of the operating handle 4 from the first position (FIG. 3) toward the second position (shown in phantom line drawing in FIG. 3), each of the cams 14 engages and moves a corresponding first protrusion 18 and the corresponding one of the first, second or third pole shafts 114,117,119 from which it extends. This, in turn, moves the corresponding opening spring 120, which is coupled to the corresponding first protrusion 18, resulting in the aforementioned second force of the magnet 116 being overcome by the force exerted on first protrusion 18 from cam 14 and the first force of the opening spring 120. In other words, after movement of the opening spring 120 is initiated by the cam assembly 10, the break-away force of the magnet 116 is overcome and the first force of opening spring 120 facilitates the pivoting of the pole shafts 114,117,119 and, ultimately, opens the separable contacts 108.

EXAMPLE 6

Figure 4:
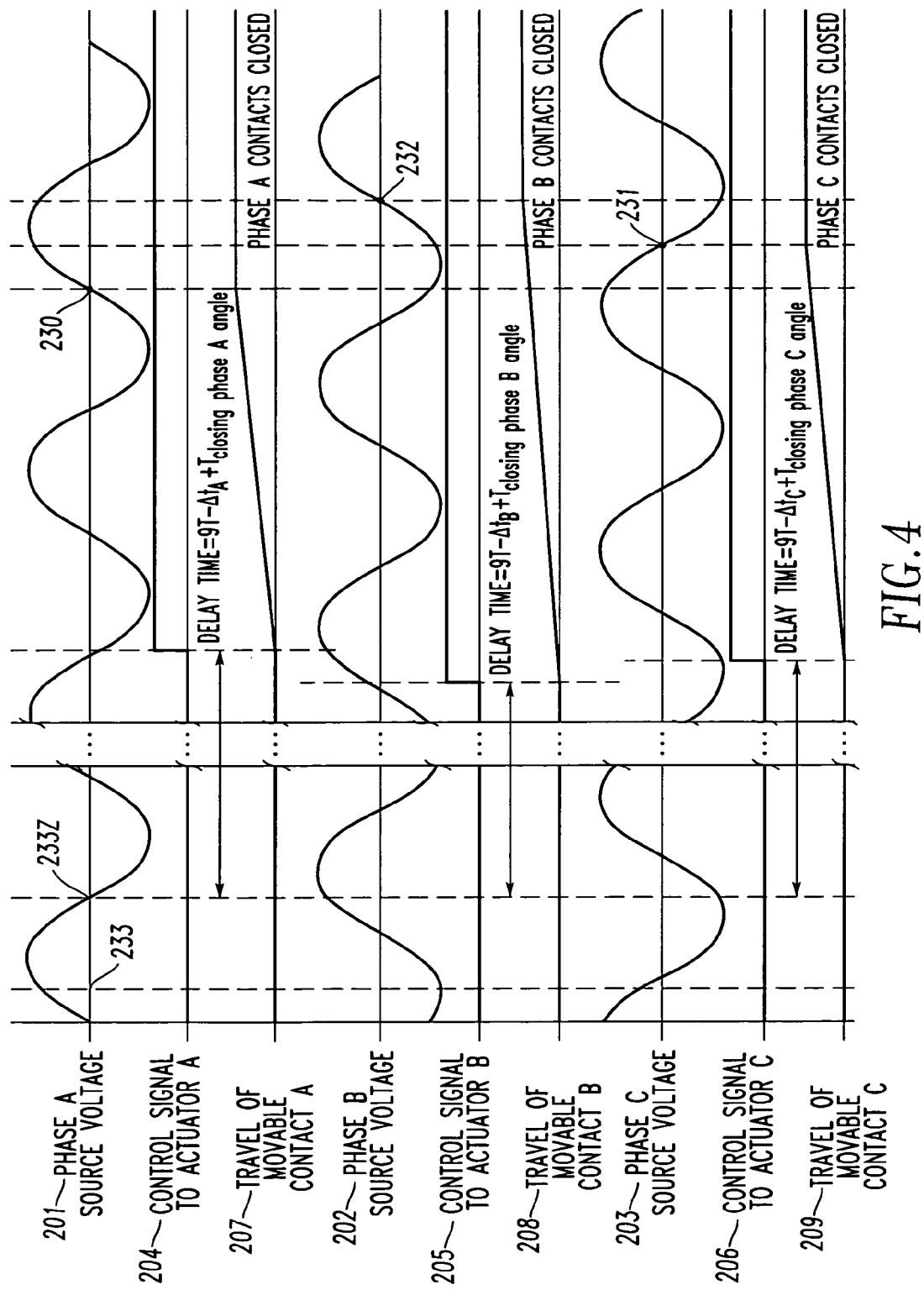
FIGS. 4-6 are plots of three-phase source voltages, three-phase actuator control signals and three-phase movable contact travels for a grounded capacitor bank, an un-grounded capacitor bank and a transformer, respectively.

FIG. 4 is a plot of three-phase source voltages 201,202,203, three-phase actuator control signals 204,205,206 and three-phase movable contact travels 207,208,209 for a grounded capacitor bank point-on-wave switching characteristic. In this example, the phase A voltage sensor 51 (FIG. 1) is structured to sense the line voltage of pole 101, which includes a zero crossing at, for example, 233Z. The POW controller 146 (FIG. 1) cooperates with the voltage sensor 51 and the actuators 112 of the independent poles 101,103,105 to synchronously close the separable contacts 108 of the first pole 101 at about zero degrees with respect to the zero crossing of the sensed voltage as shown at 230, to synchronously close the separable contacts 108 of the second pole 103 at about 120 degrees with respect to the zero crossing of the sensed voltage as shown at 232, and to synchronously close the separable contacts 108 of the third pole 105 at about 60 degrees with respect to the zero crossing of the sensed voltage as shown at 231.

EXAMPLE 7

Figure 5:
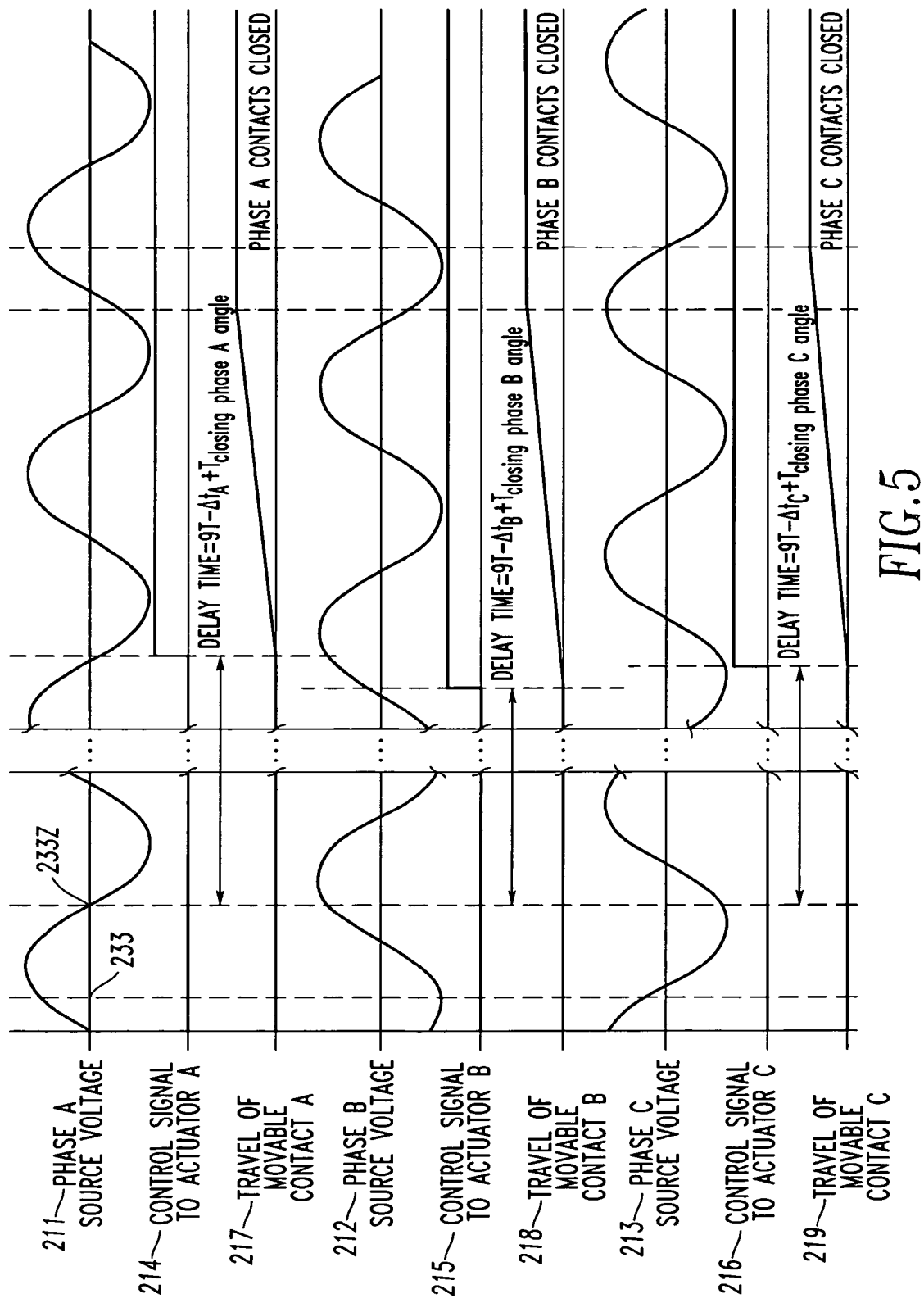

FIG. 5 is a plot of three-phase source voltages 211,212,213, three-phase actuator control signals 214,215,216 and three-phase movable contact travels 217,218,219 for an un-grounded capacitor bank point-on-wave switching characteristic.

EXAMPLE 8

Figure 6:
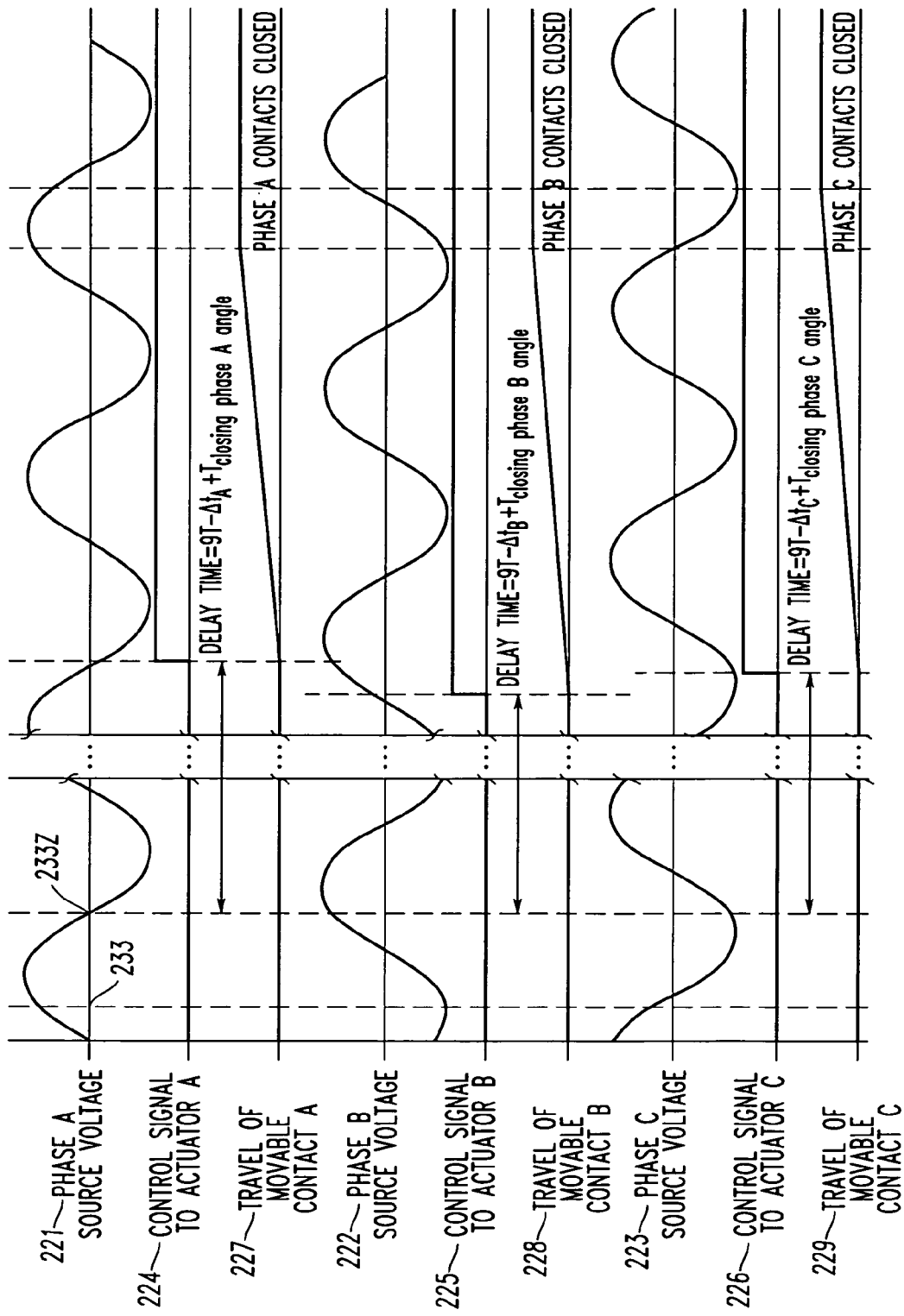

FIG. 6 is a plot of three-phase source voltages 221,222,223, three-phase actuator control signals 224,225,226 and three-phase movable contact travels 227,228,229 for a transformer point-on-wave switching characteristic.

EXAMPLE 9

Figure 7:
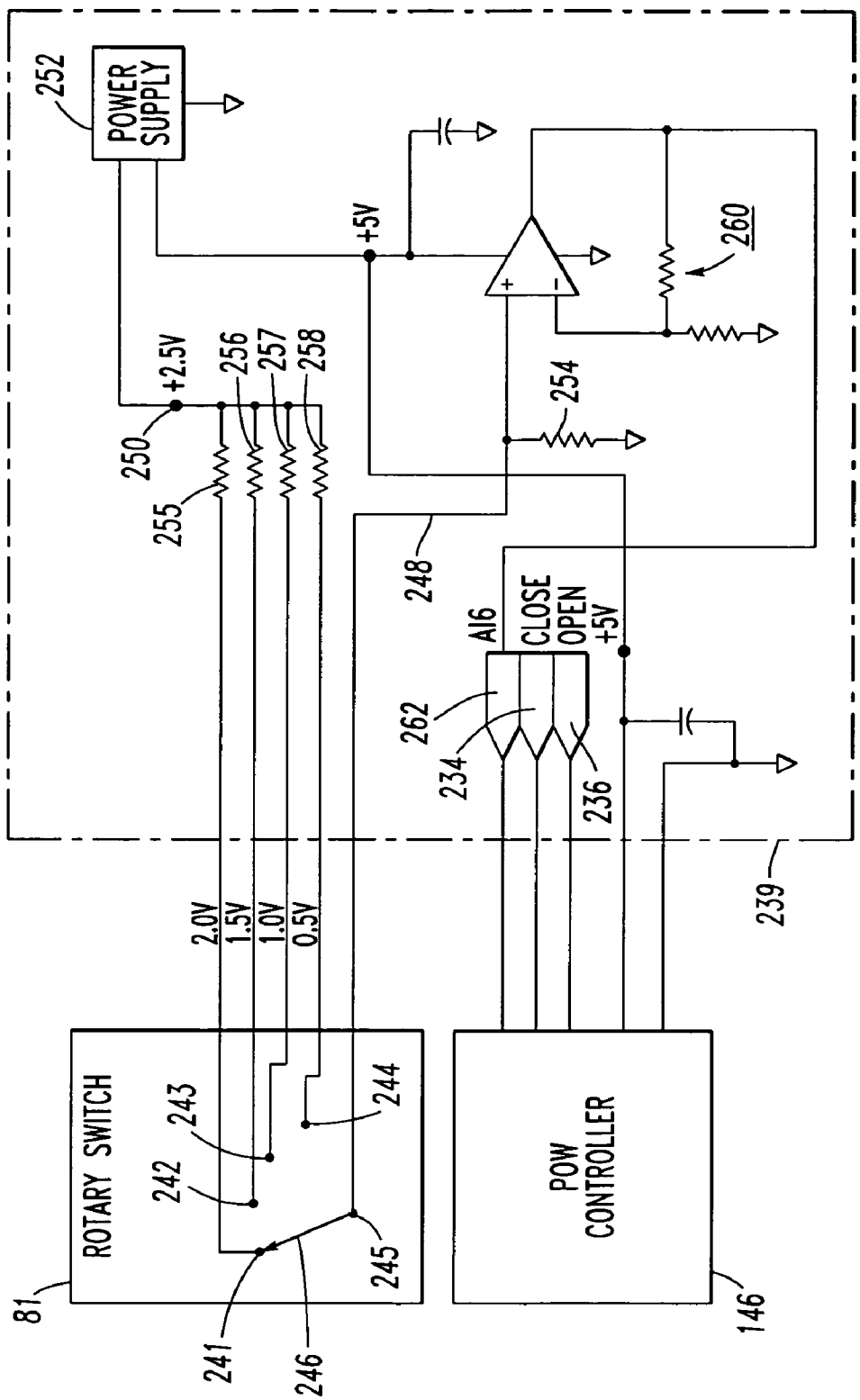
FIG. 7 is a block diagram in schematic form of a manual rotary switch selector and interface circuit for the POW controller of the POW circuit breaker of FIG. 1.

The different closing switching characteristics of Examples 6-8 (respective FIGS. 4-6) may be selected by the example manual selector 81 as input by the POW controller 146 of FIG. 7. For example, considering the grounded capacitor bank point-on-wave switching characteristic of FIG. 4 (Example 6), pole A (e.g., without limitation, first pole 101)

would first close on the phase A voltage zero crossing at 230, then pole C (e.g., without limitation, third pole 103) would close 60° after pole A at 231, and then pole B (e.g., without limitation, second pole 102) would close 120° after pole A at 232. In a 60 Hz system, for example, 360° is equivalent to ¹⁄₆₀$^{th}$ of a second. Since each of the poles 101,103,105 is independently operated and controlled by the POW controller 146, it is possible to achieve this through purely electronic control.

It is also possible to disable the POW switching via the manual selector 81. For example, this function may be employed for demonstration purposes or for initial circuit breaker testing purposes. Preferably, that function is automatically disabled in the event of an overcurrent, a short circuit or other fault condition. In that event, the circuit breaker 100 opens and closes like a conventional circuit breaker.

Table 1 shows example control settings for the different closing switching characteristics of Examples 6-8 (respective FIGS. 4-6) and for the corresponding different opening switching characteristics (not shown in FIGS. 4-6).

this synchronization. The closing command 233 is provided to the POW controller 146 (FIG. 7) through a close (ON) input 234 (FIGS. 7-9) as, for example, manually input from a CLOSE pushbutton 235 of the front panel 83 of FIG. 1. Additionally, one or more remote or remotely communicated close inputs (not shown) may be employed.

In a similar manner, for the different opening switching characteristics of Table 1, the opening sequence is initiated by an opening command, which is most typically asynchronous with the three-phase load currents as sensed, for example, by the current sensor 61 (FIGS. 1 and 8B), as synchronized with the zero crossing of one of the three-phase load currents, such as the example phase A zero crossing. Although phase A/pole A is shown, any of the three three-phase load currents may be employed for this synchronization. The opening command is provided to the POW controller 146 (FIG. 7) through an open (OFF) input 236 (FIGS. 7, 8A-8B and 9) as, for example, manually input from an OPEN pushbutton 237 of the front panel 83 of FIG. 1. Additionally, one or more remote or remotely communicated open inputs (not shown) may be employed. Table 1 shows the relative timings of the different

TABLE 1

| Application | Closing/Opening | Phase A | Phase B | Phase C |
|---|---|---|---|---|
| Grounded Capacitor Bank | Closing | 0° at phase A voltage | 120° at phase A voltage | 60° at phase A voltage |
| Grounded Capacitor Bank | Opening | about 1 ms after 0° at phase A current | about 1 ms after 120° at phase A current | about 1 ms after 60° at phase A current |
| Un-Grounded Capacitor Bank | Closing | −30° at phase A voltage | −30° at phase A voltage | 60° at phase A voltage |
| Un-Grounded Capacitor Bank | Opening | about 1 ms after 0° at phase A current | about 1 ms after 90° at phase A current | about 1 ms after 90° at phase A current |
| Transformer | Closing | 60° at phase A voltage | 60° at phase A voltage | 150° at phase A voltage |
| Transformer | Opening | about 2 ms before 0° at phase A current | about 2 ms before 90° at phase A current | about 2 ms before 90° at phase A current |

Table 2 shows example control settings for energizing an inductive load for various motor connections.

opening switching characteristics with respect to the example phase A current zero crossing.

TABLE 2

| Application | Closing/Opening | Phase A | Phase B | Phase C |
|---|---|---|---|---|
| Wye | Closing | about 60° at phase A voltage | about 60° at phase A voltage | about 150° at phase A voltage |
| Delta (contactor/circuit breaker inside Delta) | Closing | about 30° at phase A voltage | about 150° at phase A voltage | about 150° at phase A voltage |
| Delta (contactor/circuit breaker outside Delta) | Closing | about 60° at phase A voltage | about 60° at phase A voltage | about 150° at phase A voltage |

In the different closing switching characteristics of Examples 6-8 (respective FIGS. 4-6), the closing sequence is initiated by the closing command 233, which is most typically asynchronous with the three-phase source voltages, such as 201 (FIG. 4), as synchronized with the zero crossing of one of the three-phase source voltages, such as the example phase A zero crossing at 233Z. Although phase A/pole A is shown, any of the three three-phase source voltages may be employed for For example, for the transformer or for the un-grounded capacitor bank of Table 1, above, the current sensor 61 is structured to sense a current, which includes a zero crossing, operatively associated with the first pole 101. The POW controller 146 cooperates with the current sensor 61 and the actuators 112 of the independent poles 101,103,105 to synchronously open the separable contacts 108 of the first pole 101 at about zero degrees with respect to the zero crossing of the sensed current, to synchronously open the separable contacts 108 of the second pole 103 at about 90 degrees with respect to the zero crossing of the sensed current, and to synchronously open the separable contacts 108 of the third pole 105 at about 90 degrees with respect to the zero crossing of the sensed current.

EXAMPLE 10

FIG. 7 shows an example interface circuit 239 between the example manual rotary switch selector 81 and the POW controller 146 of FIG. 1. Here, the manual selector 81 includes four different rotary positions corresponding to four different electrical outputs 241,242,243,244 one of which is electrically connected to a common output 245 by a rotary arm 246. These four positions establish a corresponding voltage 248 on output 245. The voltage 248 (e.g., +2.0 V, +1.5 V, +1.0 V, +0.5 V) is determined from a voltage 250 (+2.5 V) output by power supply 252, which voltage is divided by a divider formed by resistor 254 and one of four resistors 255,256,257,258, as selected by the four different rotary positions corresponding to the respective electrical outputs 241,242,243,244. The selected voltage 248 of output 245 is buffered by follower 260 to an analog input 262 (AI6) of the POW controller 146. In this example, the four rotary positions corresponding to the four outputs 241,242,243,244 correspond to a non-POW mode, a transformer point-on-wave switching characteristic, an un-grounded capacitor bank point-on-wave switching characteristic and a grounded capacitor bank point-on-wave switching characteristic, respectively. For the three different POW switching characteristics (Table 1), the POW controller 146 independently and synchronously opens and closes the separable contacts 108 of the independent poles 101,103,105. For the non-POW mode, the POW controller 146 opens the separable contacts 108 of all of the independent poles 101, 103,105 at about the same time, or closes such separable contacts of all of the poles at about the same time in the manner of a conventional non-POW circuit breaker.

EXAMPLE 11

Figure 8A:
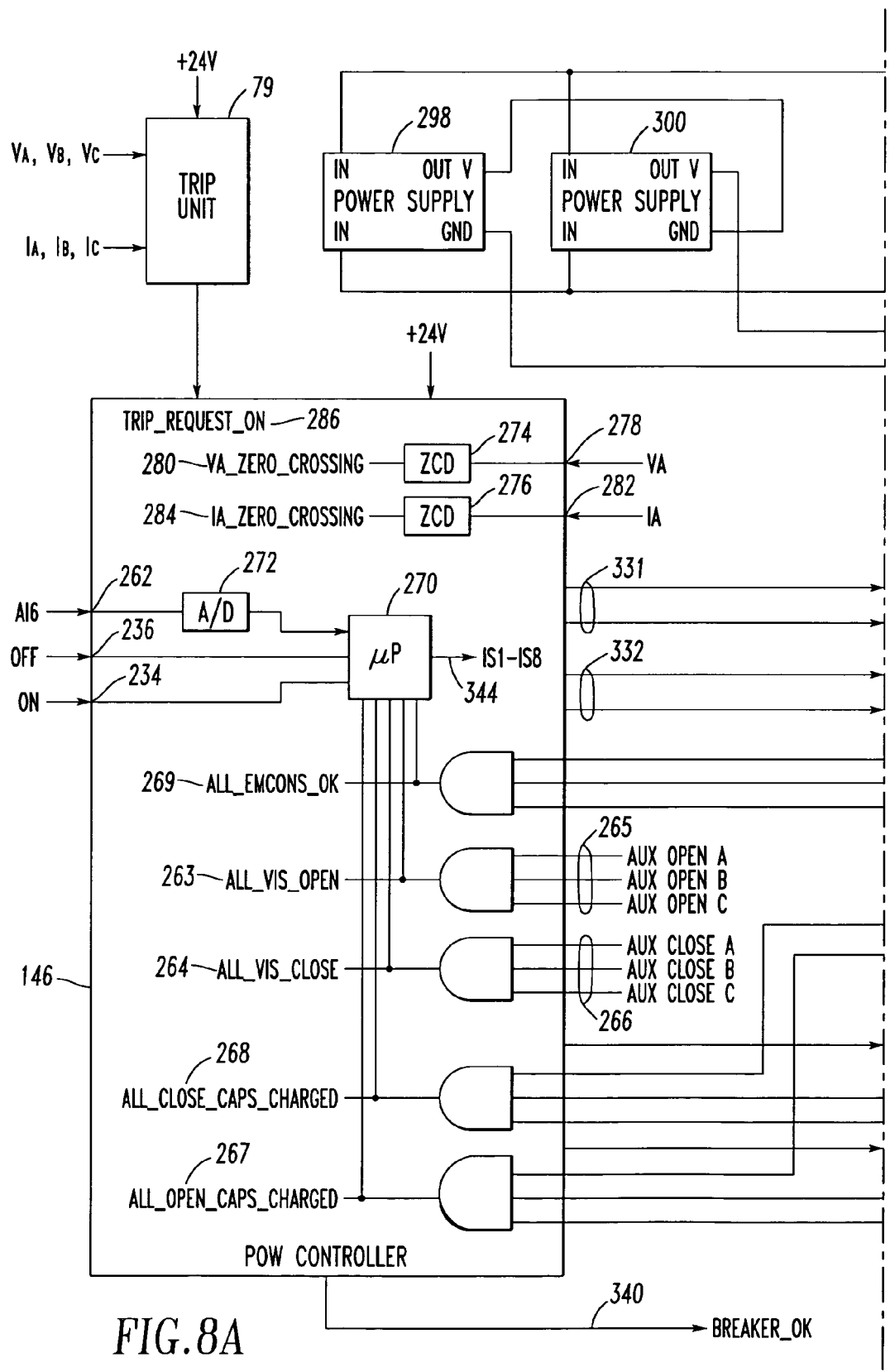
FIGS. 8A-8B form a block diagram of the wiring of the POW controller, the trip unit and the three electro-magnetic actuator controllers of the POW circuit breaker of FIG. 1.
Figure 8B:
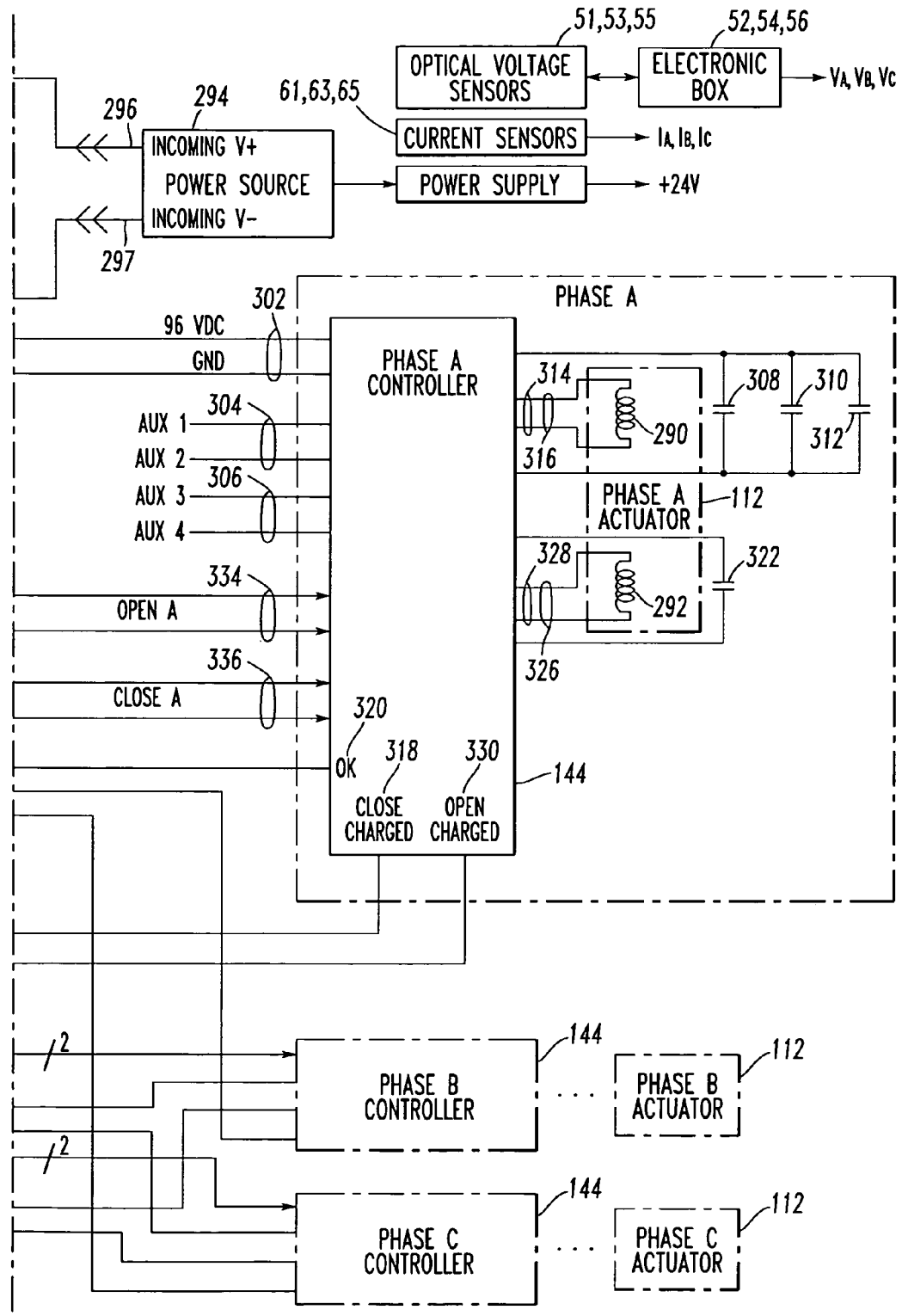

FIGS. 8A-8B show the wiring of the POW controller 146, the trip unit 79 and three electro-magnetic actuator controllers (EMCONs) 144 of the circuit breaker 100 of FIG. 1. The POW controller 146, which monitors various aspects of the function and performance of the circuit breaker 100, manages synchronous POW switching. The primary function of the POW controller 146 is to determine when to synchronously open and close the circuit breaker 100 at specific phase angles of a predetermined load current (e.g., without limitation, the output of current sensor 61; sensed current $I_A$) or a predetermined line voltage (e.g., the output of voltage sensor 51; sensed voltage $V_A$). The POW controller 146 also monitors the position of each of the three poles (ALL_VIS_OPEN 263 or ALL_VIS_CLOSE 264) as determined by auxiliary switch open signals 265 and auxiliary switch close signals 266, the proper charge on the open capacitors (ALL_OPEN_CAPS_CHARGED 267), the proper charge on the close capacitors (ALL_CLOSE_CAPS_CHARGED 268), and the general health of the circuit breaker (ALL_EMCONS_OK 269).

The electronic POW controller 146 includes a processor (μP) 270, an analog-to-digital converter (A/D) 272, two zero-crossing detectors (ZCD) 274,276 and a plurality of digital and analog inputs and outputs as will be described. Although the example POW controller 146 includes the μP 270, it will be appreciated that a combination of one or more of analog, digital and/or processor-based circuits may be employed. An electronic analog input 278 receives the sensed voltage ($V_A$) for one of the independent poles (e.g., pole 101). The voltage ZCD 274 outputs a corresponding zero crossing detection signal (VA_ZERO_CROSSING 280). Another electronic analog input 282 receives the sensed current ($I_A$) for one of the independent poles (e.g., pole 101). The current ZCD 276 outputs a corresponding zero crossing detection signal (IA_ZERO_CROSSING 284).

The trip unit 79 receives the sensed currents ($I_A$, $I_B$, $I_C$) for the independent poles 101,103,105 from the current sensors 61,63,65, respectively, and outputs a conventional trip signal (TRIP_REQUEST_ON 286) to the POW controller 146 in response thereto.

The phase A controller 144 will now be described and it will be appreciated that the phase B and phase C controllers 144 function in a similar manner. The controller 144 includes a combination of one or more of analog, digital and/or processor-based circuits. The phase A controller 144 cooperates with the POW controller 146 to drive the phase A actuator 112, which includes a closing coil 290 and an opening coil 292.

A suitable power source 294 (e.g., without limitation, 100-240 VAC; 100-300 VDC) provides incoming V+ 296 and incoming V− 297 inputs to two direct current (DC) power supplies 298,300. The two DC power supplies 298,300 in this example each provide +48 VDC outputs, which are summed to provide +96 VDC at inputs 302 of the phase A controller 144. For convenience of illustration, only the inputs 302 of the phase A controller 144 are shown. It will be appreciated that each of the other controllers 144 has two similar DC power supplies (not shown).

The auxiliary switches (not shown) of the circuit breaker 100 (FIG. 1) provide AUX 1 and AUX 2 signals at 304 (AUX OPEN A) that are open when the circuit breaker 100 is open, and which provide AUX 3 and AUX 4 signals at 306 (AUX CLOSE A) that are closed when the circuit breaker 100 is open.

The controller 144 preferably includes a circuit (not shown) that maintains a reserve charge on capacitors 308, 310,312 for powering the closing coil 290 through outputs 314 that drive a close signal 316. The controller 144 also drives output 318 (CLOSE CHARGED) whenever the three close capacitors 308,310,312 are fully charged. The controller 144 further drives output 320 (OK) to indicate circuit breaker phase A wellness. The controller 144 preferably includes a circuit (not shown) that maintains a reserve charge on capacitor 322 for powering the opening coil 292 through outputs 326 that drive an open signal 328. The controller 144 also drives output 330 (OPEN CHARGED) whenever the open capacitor 322 is fully charged.

The POW controller 146 includes an electronic open output 331 and an electronic close output 332 for each of the three EMCONS 144, as shown with the phase A controller 144. The phase A controller 144, in turn, includes an electronic open input 334 receiving the electronic open output 331, and an electronic close input 336 receiving the electronic close output 332. Responsive to the electronic open input 334 from the POW controller 146, the phase A controller 144 powers the actuator opening coil 292 through the outputs 326 that drive the open signal 328. Responsive to the electronic close input 336 from the POW controller 146, the phase A controller 144 powers the actuator closing coil 290 through the outputs 314 that drive the close signal 316.

EXAMPLE 12

FIG. 9 shows an example of POW logic 338 of the POW controller 146 of FIG. 1. Whenever ALL_EMCONS_OK 269 is true and one of ALL_VIS_OPEN 263 or ALL_VIS_CLOSE 264 is true, a system healthy status (BREAKER_OK 340) is output to indicator 342 (FIG. 1). Based upon the selected state of the manual rotary switch selector 81 (FIGS. 1 and 7), the close input 234, and the open input 236, the POW controller μP 270 (FIG. 8A) determines one of eight state signals (IS1-IS8) 344 for input by the POW logic 338. In turn, the POW logic 338 outputs to the outputs 331,332 (FIG. 8A) for each of the EMCONs 144 close or open actuator control signals 346 (FIG. 9) for the corresponding selected POW switching characteristic, wherein $VI_A$ is the phase A vacuum interrupter 111, $VI_B$ is the phase B vacuum interrupter 113, and $VI_C$ is the phase C vacuum interrupter 115. Here, FIG. 9 generally follows Table 1, with the following differences. Signal IS4 corresponds to conventional non-POW mode closing of FIG. 7 in which the separable contacts 108 of all of the independent poles 101,103,105 are closed at about the same time, without delay. Signal IS8 corresponds to conventional non-POW mode opening of FIG. 7, or tripping responsive to the TRIP-REQUEST ON 286 from the trip unit 79, in which the separable contacts 108 of all of the independent poles 101,103,105 are opened at about the same time, without delay.

Output signals S1-S3 and S5-S7 include an example nine cycle (9T) delay as shown in connection with FIGS. 4-6. Output signals S5,S6 also include an additional delay (e.g., about 1 mS) term, which is employed to allow maximum contact gap before the voltage across the contact gap reaches its maximum value. Output signals S7 also include a reduced (or negative) delay (e.g., about −2 ms) term, which is employed to minimize arcing energy during interruption.

EXAMPLE 13

Figure 10:
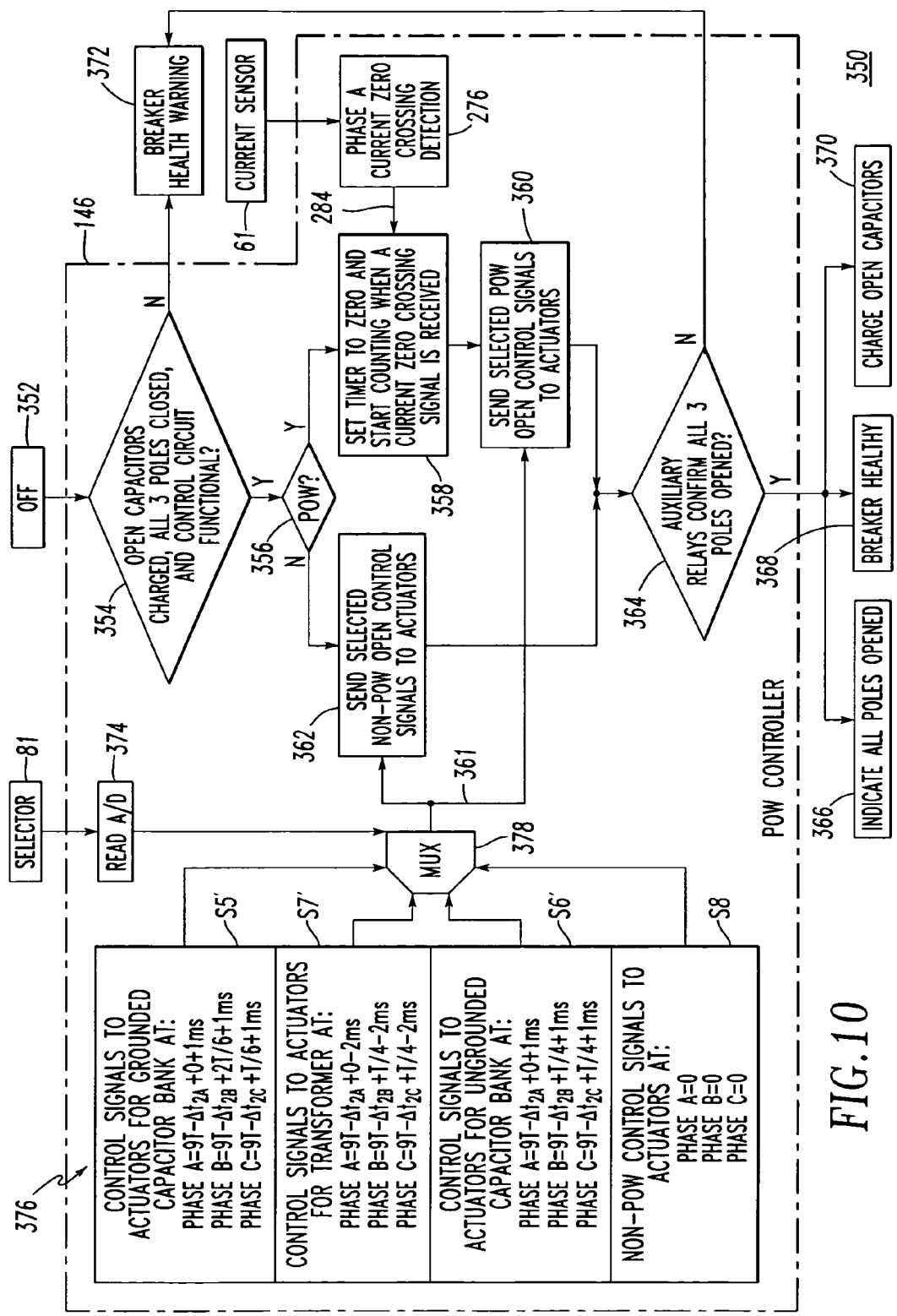
FIGS. 10-12 are flowcharts of the off, on and trip routines, respectively, of the POW controller of FIG. 7.

FIG. 10 shows an off routine 350 for the POW controller 146 of FIG. 1. At 352, the POW μP 270 (FIG. 8A) detects the active state of the open input 236 (OFF). Next, at 354, it is determined if all of the open capacitors are charged (ALL_OPEN_CAPS_CHARGED 267), if all three poles are closed (ALL_VIS_CLOSE 264) and if the control circuit is functional (ALL_EMCONS_OK 269). If so, then at 356, it is determined if the POW mode is selected (states S1'-S3' (FIG. 11) or states S5'-S7'). If so, then, at 358, a timer (not shown) of the POW μP 270 is set to zero and counting thereof is started upon receipt of the phase A current zero crossing detection signal (IA_ZERO_CROSSING 284 of FIG. 8A). In turn, at 360, at the proper POW times (e.g., Table 1), the selected POW open control signals 361 (FIG. 10) are sent to the opening coils 292 of the three actuators 112. Next, at 364, it is determined if the auxiliary relays confirm that all three poles are open (ALL_VIS_OPEN 263 of FIG. 8A). If so, then at 366, indicator 367 (FIG. 1) is illuminated to indicate that all three poles are opened, at 368, indicator 342 is illuminated to indicate that the circuit breaker 100 is healthy, and at 370, the open capacitor 322 (FIG. 8B) is charged. Otherwise, if the test at 364 failed, then indicator 342 is extinguished, at 372, to indicate that the circuit breaker 100 is not healthy.

On the other hand, if the test at 356 failed, and the non-POW mode is selected (state S4 (FIG. 11) or S8), then, at 362, the selected non-POW open control signals 361 (FIG. 10) are immediately sent to the opening coils 292 of the three actuators 112, after which step 364 is executed, as was discussed.

States S5'-S7' are generally the same as the states S5-S7, respectively, of FIG. 9, except that the electronic open outputs 331 (FIG. 8A) for the three phase A-C controllers 144 are output at relatively earlier times (e.g., $\Delta t_{2A}$, $\Delta t_{2B}$, $\Delta t_{2C}$, respectively, earlier than the corresponding times for states S5, S6 or S7 of FIG. 9) in order to account for mechanical delays in the poles 101,103,105. For example, such mechanical delays may arise from the characteristics of the particular actuators 112, linking members 24 and vacuum interrupters 111,113,115. It will be appreciated that the times $\Delta t_{2A}$, $\Delta t_{2B}$, $\Delta t_{2C}$ may be predetermined based upon the generally design of the circuit breaker 100 (and, thus, may be the same), or may be measured and predetermined based upon the specific components of a specific circuit breaker (and, thus, two or all three times may be different).

Step 374 of FIG. 10 reads the POW A/D 272 (FIG. 8A) and determines the selected one of the states S5'-S7' or S8 from the digital value corresponding to the analog input 262 (AI6) of FIG. 7. That value is used to select the proper POW open control signals 361 for output by multiplexer function 378.

EXAMPLE 14

Figure 11:
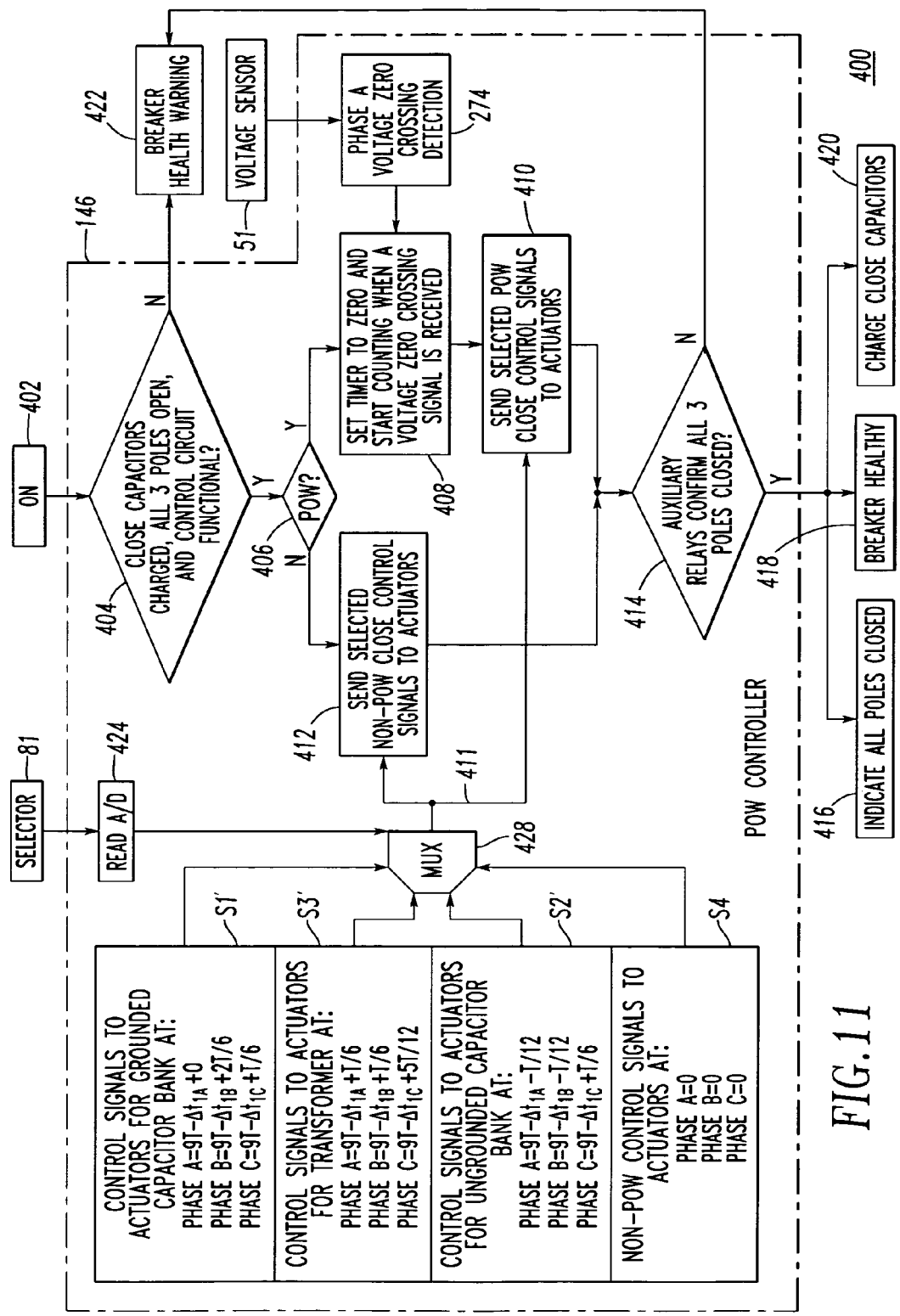

FIG. 11 shows an off routine 400 for the POW controller 146 of FIG. 1. At 402, the POW μP 270 detects the active state of the close input 236 (OPEN). Next, at 404, it is determined if all of the close capacitors are charged (ALL_CLOSE_CAPS_CHARGED 268), if all three poles are open (ALL_VIS_OPEN 263) and if the control circuit is functional (ALL_EMCONS_OK 269). If so, then at 406, it is determined if the POW mode is selected (states S1'-S3' (FIG. 11) or states S5'-S7'). If so, then, at 408, a timer (not shown) of the POW 11P 270 is set to zero and counting thereof is started upon receipt of the phase A voltage zero crossing detection signal (VA_ZERO_CROSSING 280). In turn, at 410, at the proper POW times (e.g., Table 1), the selected POW close control signals 411 are sent to the closing coils 290 of the three actuators 112. Next, at 414, it is determined if the auxiliary relays confirm that all three poles are closed (ALL_VIS_CLOSE 264). If so, then at 416, indicator 417 (FIG. 1) is illuminated to indicate that all three poles are closed, at 418, indicator 342 is illuminated to indicate that the circuit breaker 100 is healthy, and at 420, the close capacitor 322 is charged. Otherwise, if the test at 414 failed, then indicator 342 is extinguished, at 422, to indicate that the circuit breaker 100 is not healthy.

On the other hand, if the test at 406 failed, and the non-POW mode is selected (state S4 (FIG. 11) or S8), then, at 412, the selected non-POW open control signals 411 (FIG. 11) are immediately sent to the closing coils 290 of the three actuators 112, after which step 414 is executed, as was discussed.

States S1'-S3' are generally the same as the states S1-S3, respectively, of FIG. 9, except that the electronic close outputs 332 (FIG. 8A) for the three phase A-C controllers 144 are output at relatively earlier times (e.g., $\Delta t_{2A}$, $\Delta t_{2B}$, $\Delta t_{2C}$, respectively, earlier than the corresponding times for states S1, S2 or S3 of FIG. 9) in order to account for mechanical delays in the poles 101,103,105. For example, such mechanical delays may arise from the characteristics of the particular actuators 112, linking members 24 and vacuum interrupters 111,113,115. It will be appreciated that the times $\Delta t_{2A}$, $\Delta t_{2B}$, $\Delta t_{2C}$ may be predetermined based upon the generally design of the circuit breaker 100 (and, thus, may be the same), or may be measured and predetermined based upon the specific components of a specific circuit breaker (and, thus, two or all three times may be different). Although the times $\Delta t_{2A}$, $\Delta t_{2B}$, $\Delta t_{2C}$ for opening (FIG. 10) and closing (FIG. 11) are shown to be the same, it will be appreciated that these times may be different.

Step 424 of FIG. 11 reads the POW A/D 272 (FIG. 8A) and determines the selected one of the states S1'-S3' or S8 from the digital value corresponding to the analog input 262 (AI6) (FIG. 7). That value is used to select the proper POW close control signals 411 for output by multiplexer function 428.

EXAMPLE 15

Figure 12:
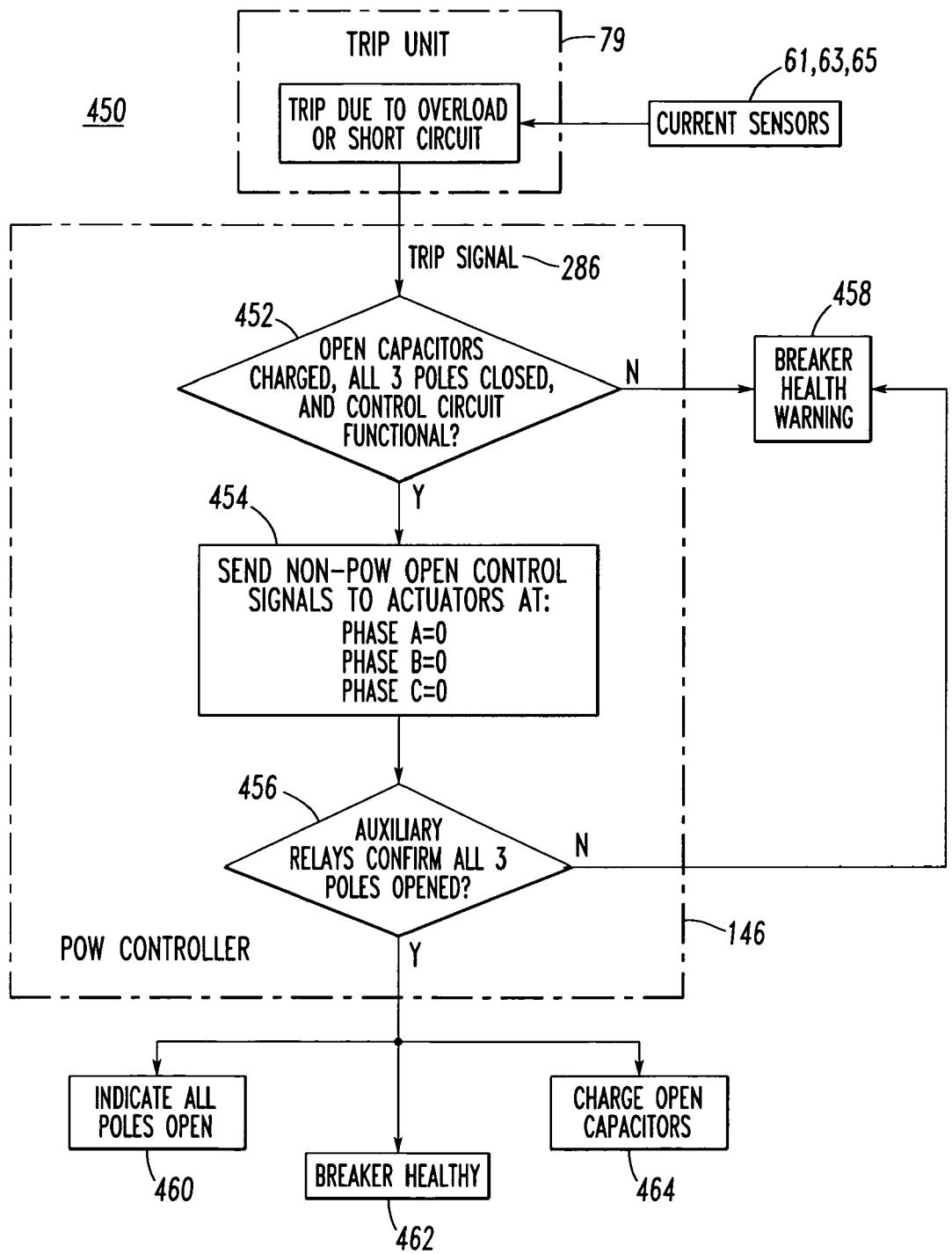

FIG. 12 shows the trip routine 450 of the POW controller 146, which receives the conventional trip signal (TRIP_REQUEST_ON) 286 from the trip unit 79. First, at 452, it is determined if all of the open capacitors are charged (ALL_OPEN_CAPS_CHARGED 267 of FIG. 8A), if all three poles are closed (ALL_VIS_CLOSE 264 of FIG. 8A) and if the control circuit is functional (ALL_EMCONS_OK 269 of FIG. 8A). If so, then at 454, conventional, non-POW open control signals are immediately and simultaneously sent to the opening coils 292 of the three actuators 112. Next, at 456, it is determined if the auxiliary relays confirm that all three poles are open (ALL_VIS_OPEN 263 of FIG. 8A). If so, then at 460, indicator 367 (FIG. 1) is illuminated to indicate that all three poles are opened, at 462, indicator 342 is illuminated to indicate that the circuit breaker 100 is healthy, and at 464, the open capacitor 322 is charged. Otherwise, if the test at 456 failed, then indicator 342 is extinguished, at 458, to indicate that the circuit breaker 100 is not healthy.

EXAMPLE 16

Figure 14:
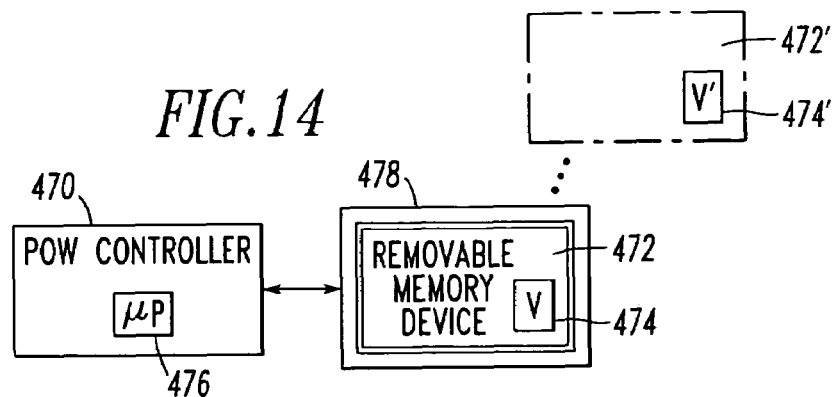
FIGS. 14-17 are block diagrams of POW controllers and manual selectors therefor in accordance with other embodiments of the invention.

FIG. 14 shows a POW controller 470, which is similar to the POW controller 146 of FIG. 1, and a manual selector 472 therefor. Here, the manual selector is a removable memory device 472 including a predetermined value (V) 474. The POW controller 470 includes a processor (μP) 476 structured to read the removable memory device 472 and to independently and synchronously open and close the separable contacts 108 of the independent poles 101,103,105 (FIG. 1) as a function of the predetermined value 474 from the removable memory device 472. A different point-on-wave switching characteristic may be manually selected by removing the removable memory device 472 including a first predetermined value (e.g., without limitation, V=2 for a transformer) from a suitable memory holding device 478, and manually replacing the removable memory device 472 with another different removable memory device 472' (shown in phantom line drawing) or with the same, but modified, removable memory device (not shown) including a different second predetermined value (e.g., without limitation, V'=3 for an un-grounded capacitor bank) 474' corresponding to the desired different point-on-wave switching characteristic.

EXAMPLE 17

Figure 15:
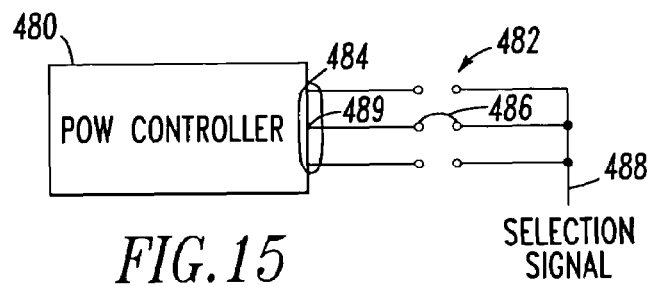

FIG. 15 shows a POW controller 480, which is similar to the POW controller 146 of FIG. 1, and a manual selector 482 therefor. Here, the POW controller 480 includes a plurality of inputs 484, and the manual selector is a number of jumpers 482 corresponding to a number of the inputs 484 of the POW controller 480. For example, there are three of the inputs 484, which correspond to a transformer, a grounded capacitor bank and an un-grounded capacitor bank. Here, for example, the jumper 486 provides a suitable selection signal 488 to the input 489, which corresponds to a grounded capacitor bank. The other two of the non-selected inputs 484 correspond to a transformer and an un-grounded capacitor bank.

EXAMPLE 18

Figure 16:
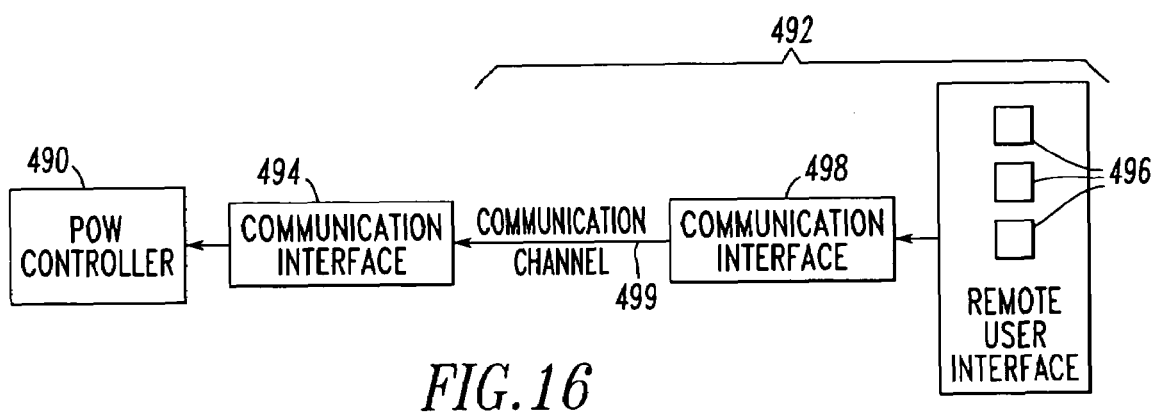

FIG. 16 shows a POW controller 490, which is similar to the POW controller 146 of FIG. 1, and a manual selector 492 therefor. Here, the POW controller 490 includes a first communication interface 494. The manual selector is a remote user interface 492 including a number of manual inputs 496 corresponding to the various point-on-wave switching characteristics, a second communication interface 498 inputting the manual inputs 496 and a communication channel 499 between the first and second communication interfaces 494, 498. The first and second communication interfaces 494,498 and the communication channel 499 cooperate to input the manual inputs 496 to the POW controller 490.

EXAMPLE 19

Figure 17:
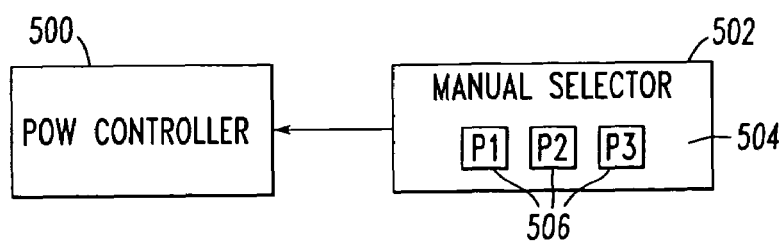

FIG. 17 shows a POW controller 500, which is similar to the POW controller 146 of FIG. 1, and a manual selector 502 therefor. Here, the manual selector 502 includes a local user interface 504 having a number of manual inputs 506 corresponding to the various point-on-wave switching characteristics.

The example circuit breaker poles 101,103,105 of FIG. 1 are respectively electrically connected to the phase A, phase B and phase C line power buses 71,73,75. Alternatively, the circuit breaker poles 101,103,105 need not be connected to the line power buses in that exact phase sequence, although the corresponding closing angles and opening angles would need to be suitably adjusted if they are not in the sequence of phases A, B and C, or phases C, A and B, or phases B, C and A.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A circuit interrupter comprising:
   a circuit interrupter housing;
   a plurality of independent poles, each of said independent poles comprising:
      separable contacts,
      at least one sensor, one of said at least one sensor being mounted on or within said circuit interrupter housing and being structured to sense voltage operatively associated with said separable contacts, and
      an actuator structured to open and close said separable contacts; and
   a point-on-wave controller housed by said circuit interrupter housing and cooperating with the sensors and the actuators of said independent poles to independently and synchronously open and close the separable contacts of said independent poles.

2. The circuit interrupter of claim 1 wherein a count of said independent poles is three.

3. The circuit interrupter of claim 1 wherein said actuators are electro-mechanical actuators; wherein each of said electro-mechanical actuators includes an open input and a close input; and wherein said point-on-wave controller is an electronic point-on-wave controller including a plurality of electronic outputs driving the open and close inputs of said electro-mechanical actuators.

4. The circuit interrupter of claim 1 wherein said circuit interrupter is a medium voltage circuit breaker.

5. The circuit interrupter of claim 1 wherein said circuit interrupter is a medium voltage vacuum circuit interrupter.

6. The circuit interrupter of claim 1 wherein said at least one sensor includes a current transformer structured to sense current operatively associated with the separable contacts of a corresponding one of said independent poles.

7. The circuit interrupter of claim 6 wherein said point-on-wave controller is an electronic point-on-wave controller including an electronic input receiving said sensed current for one of said independent poles.

8. The circuit interrupter of claim 1 wherein said one of said at least one sensor is an electro-optical sensor.

9. The circuit interrupter of claim 8 wherein said voltage is a medium voltage; wherein said circuit interrupter is a medium voltage circuit interrupter; and wherein said electro-optical sensor is structured to sense said medium voltage.

10. The circuit interrupter of claim 9 wherein said medium voltage is from about 1 kV to about 40 kV.

11. A circuit breaker comprising:
a circuit breaker housing;
a plurality of independent poles, each of said independent poles comprising:
separable contacts,
a voltage sensor mounted on or within said circuit breaker housing, said voltage sensor being structured to sense voltage operatively associated with said separable contacts,
a current sensor structured to sense current operatively associated with said separable contacts, and
an actuator structured to open and close said separable contacts;
a point-on-wave controller integral with said circuit breaker housing, said point-on-wave controller cooperating with at least one of the voltage sensors of said independent poles, at least one of the current sensors of said independent poles and the actuators of said independent poles to independently and synchronously open and close the separable contacts of said independent poles; and
a protective relay cooperating with the current sensors of said independent poles and said point-on-wave controller to trip open the separable contacts of said independent poles.

12. The circuit breaker of claim 11 wherein said sensed current includes a zero crossing; wherein said point-on-wave controller is structured to independently and synchronously open said separable contacts of said independent poles at a plurality of different predetermined phase angles with respect to the zero crossing of said sensed current.

13. The circuit breaker of claim 11 wherein said voltage for a corresponding one of said independent poles is a medium voltage; wherein said circuit breaker is a medium voltage circuit breaker; and wherein said voltage sensor for the corresponding one of said independent poles is structured to sense said medium voltage.

14. The circuit breaker of claim 11 wherein said actuators are electro-mechanical actuators; wherein each of said electro-mechanical actuators includes an open input and a close input; and wherein said point-on-wave controller is an electronic point-on-wave controller including a plurality of electronic outputs driving the open and close inputs of said electro-mechanical actuators.

15. The circuit breaker of claim 11 wherein said voltage sensors are electro-optical voltage sensors.

16. The circuit breaker of claim 15 wherein said voltage is a medium voltage; wherein said circuit breaker is a medium voltage circuit breaker; wherein said electro-optical sensors are structured to sense said medium voltage; and wherein said medium voltage is from about 1 kV to about 40 kV.

\* \* \* \* \*